United States Patent
Ekmark et al.

(10) Patent No.: US 7,647,178 B2
(45) Date of Patent: Jan. 12, 2010

(54) METHOD AND SYSTEM FOR FORWARD COLLISION AVOIDANCE IN AN AUTOMOTIVE VEHICLE

(75) Inventors: Jonas Ekmark, Olofstorp (SE); Jonas Jansson, Linköping (SE)

(73) Assignee: Ford Global Technologies, LLC, Dearborn, MI (US)

( * ) Notice: Subject to any disclaimer, the term of this patent is extended or adjusted under 35 U.S.C. 154(b) by 462 days.

(21) Appl. No.: 11/380,748

(22) Filed: Apr. 28, 2006

(65) Prior Publication Data

US 2007/0112514 A1   May 17, 2007

(30) Foreign Application Priority Data

Apr. 29, 2005   (EP)   ................... 05009407

(51) Int. Cl.
*G08G 1/16* (2006.01)
(52) U.S. Cl. ................ 701/301; 701/29; 340/436; 340/438; 340/903
(58) Field of Classification Search ........... 701/29, 701/30, 33, 36, 901; 340/435, 436, 438, 340/903
See application file for complete search history.

(56) References Cited

U.S. PATENT DOCUMENTS

| | | | |
|---|---|---|---|
| 5,529,138 A | 6/1996 | Shaw et al. | |
| 6,246,961 B1 | 6/2001 | Sasaki et al. | |
| 6,487,500 B2 * | 11/2002 | Lemelson et al. | ........... 701/301 |
| 2005/0060069 A1 * | 3/2005 | Breed et al. | ............. 701/29 |
| 2005/0134440 A1 * | 6/2005 | Breed | ............. 340/435 |

FOREIGN PATENT DOCUMENTS

| | | |
|---|---|---|
| DE | 10254422 A1 | 6/2004 |
| WO | WO 0139018 | 5/2001 |

* cited by examiner

*Primary Examiner*—Gertrude Arthur Jeanglaud
(74) *Attorney, Agent, or Firm*—Frank A. MacKenzie; Brooks Kushman P.C.

(57) ABSTRACT

A method and system for autonomous collision avoidance in multiple obstacle scenarios. A forward collision avoidance system detects obstacles in front of a vehicle hosting the system and estimates a position, a velocity and an acceleration of each of the obstacles. The maneuvers which the vehicle is capable of performing that will lead to a collision with each respective obstacle are evaluated separately. The union of maneuvers which will lead to collision with any one of the obstacles is formed. The set of maneuvers which the vehicle is capable of performing through which collision with any of the obstacles may be avoided is established, and the set used for deciding how to avoid or mitigate collision with any one of the obstacles. Finally, a collision avoidance maneuver based on the decision is executed autonomously.

9 Claims, 2 Drawing Sheets

METHOD AND SYSTEM FOR FORWARD COLLISION AVOIDANCE IN AN AUTOMOTIVE VEHICLE

TECHNICAL FIELD

The present invention relates to forward collision warning and avoidance systems used by automotive vehicles, and specifically to a method and system for autonomous collision avoidance in multiple obstacle scenarios.

BACKGROUND OF THE INVENTION

A current trend in the automotive industry is to introduce active safety systems for avoiding or mitigating collisions. One type of system, with a potentially large positive impact on accident statistics, is a forward collision avoidance system (FCAS). An FCAS uses sensors such as RADAR (RAdio Detection And Ranging), LIDAR (LIght Detection And Ranging) and cameras to monitor the region in front of the host vehicle. In the FCAS a tracking algorithm is used to estimate the state of the objects ahead and a decision algorithm uses the estimated states to determine any action, e.g. warning the driver, autonomous braking or steering.

The decision algorithms in automotive FCAS continuously evaluate the risk for a collision. However, in such an evaluation, only one obstacle at a time is considered. Usually there exists a mechanism to determine which of the potential collision objects that is most threatening in each time instant. Such an evaluation will not consider that a maneuver that avoids one obstacle may result in a collision with another. Each obstacle is only considered a threat in itself, and not in relation to other obstacles. This results in a decision making algorithm that, in multiple obstacle scenarios, may underestimate the collision threat.

Dealing with multiple obstacles can be very complicated since the number of possible scenarios grows exponentially with the number of obstacles. This may result in computationally demanding algorithms to determine the collision threat.

SUMMARY OF THE INVENTION

One object of the invention is to provide an improved method for autonomous action in multiple obstacle scenarios in an automotive vehicle forward collision avoidance system.

Thanks to the provision of the steps of: establishing the presence of obstacles in front of a vehicle hosting said system; estimating the position, velocity and acceleration of said obstacles; evaluating for each respective one of said obstacles separately the maneuvers which the vehicle is capable of performing that will lead to a collision with said respective obstacle; forming the union of maneuvers which will lead to collision with any one of said obstacles; establishing the set of maneuvers which the vehicle is capable of performing through which collision with any of said obstacles may be avoided; using said set for deciding how to avoid or mitigate collision with any one of said obstacles; autonomously executing a collision avoidance maneuver based on said decision an improved method for autonomous action in multiple obstacle scenarios in an automotive vehicle forward collision avoidance system is provided.

A further object of the invention is to provide an improved automotive vehicle forward collision avoidance system.

Thanks to the provision of: means for establishing the presence of obstacles in front of a vehicle hosting said system; means for estimating the position, velocity and acceleration of said obstacles; means for evaluating for each respective one of said obstacles separately the maneuvers which the vehicle is capable of performing that will lead to a collision with said respective obstacle; means for forming the union of maneuvers which will lead to collision with any one of said obstacles; means for establishing the set of maneuvers which the vehicle is capable of performing through which collision with any of said obstacles may be avoided; means for, using said set, deciding how to avoid or mitigate collision with any one of said obstacles; means for autonomously executing a collision avoidance maneuver based on said decision an automotive vehicle forward collision avoidance system having improved abilities for autonomous action in multiple obstacle scenarios is provided.

DESCRIPTION OF DRAWINGS

In the following, the invention will be described in greater detail by way of example only with reference to attached drawings, in which.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DESCRIPTION OF EMBODIMENTS

Figure 1:
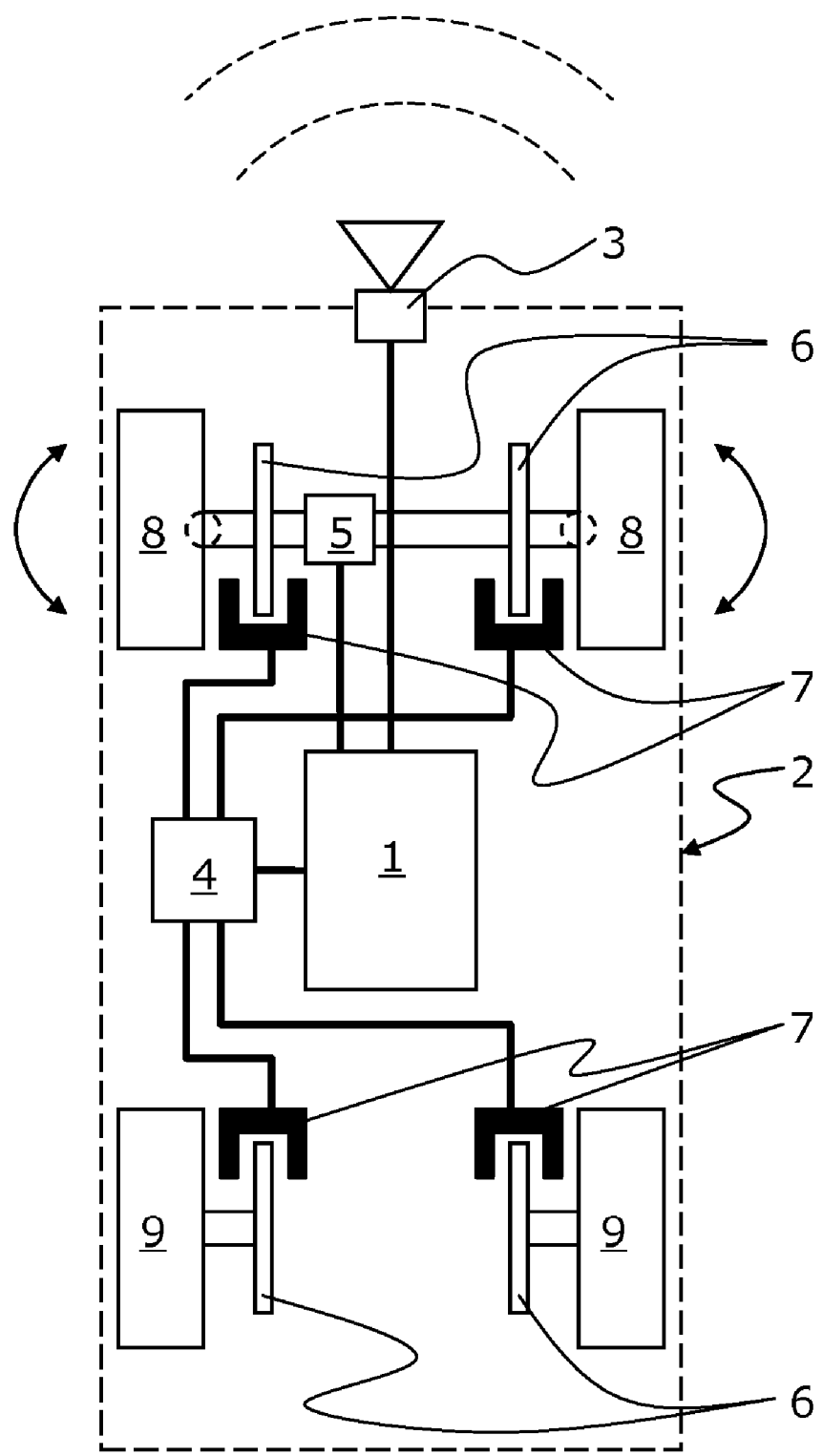
FIG. 1 is a schematic illustration of a forward collision avoidance system arranged in a host vehicle.

FIG. 1 illustrates schematically a forward collision avoidance system (FCAS) 1, arranged in a host vehicle 2 in accordance with the present invention. The host vehicle 2 has a braking system 4 such as an ABS system, e.g. with brake discs 6 and appertaining calipers 7 associated with each of the front wheels 8 and rear wheels 9. The host vehicle 2 further has a power steering system 5, which is arranged to control the steering angle of the front wheels 8. A sensor 3, such as a radar, a lidar or a camera based sensor is mounted at the front end of the host vehicle 2 and arranged to monitor the region in front of the host vehicle 2. Sensor 3 generates signals characterizing any obstacles that are detected and these signals are sent to FCAS 1. The FCAS is operatively connected with the braking system 4 and/or the power steering system 5 of the host vehicle 2. Further, the FCAS is affanged to establish the presence of obstacles in front of the host vehicle 2 and to estimate the position, velocity and acceleration of any obstacles detected based upon the signals received from the sensor 3. These estimations are then used by the FCAS to determine how to avoid or mitigate collision with any obstacle, e.g. by performing collision avoidance maneuvers such as autonomous braking or steering The method for decision-making in multiple obstacle scenarios in an automotive vehicle forward collision avoidance system in accordance with the present invention is intended to be used to evaluate the combined collision threat of multiple obstacles. This is achieved by first evaluating the maneuvers that lead to collision with each obstacle separately. The union of maneuvers that lead to collision with any obstacle is then formed. The maneuvers that will avoid collision are those that the vehicle is capable of performing except the maneuvers that lead to collision. This set is then used for decision-making.

The main idea to determine the collision threat in a multiple obstacle scenario is to search for maneuvers that avoid a collision. This is achieved through the Multiple Obstacle Algorithm as described in the following.

Initially the set E of all the possible maneuvers that the driver and vehicle can perform is defined. Then for each obstacle $i=\{1,\ldots,N\}$, a new set $f_i$ is defined, where $f_i$ defines the set of maneuvers that lead to a collision with obstacle i. The combined set of all maneuvers leading to a collision is formed. This is given by $F=f_1\cup \ldots \cup f_N$. Furthermore, all maneuvers that do not lead to a collision are given by the set $G=E\backslash F$.

A collision may be considered to be unavoidable if $G=\emptyset$.

In order to find a maneuver that avoids collision, in accordance with the present invention, it is proposed to use min(G), which denotes the maneuver with the smallest effort that avoids collision.

In the following will be described the application of the present invention to realize a collision avoidance decision function for lateral vehicle maneuvers which is a specific implementation of this idea for lateral motion i.e., steering avoidance maneuvers.

A common metric to measure the collision threat is to calculate the lateral acceleration required to avoid collision, i.e. evaluation of the possibility to avoid collision by means of steering. The lateral acceleration capability is limited by tire-to-road friction. The maximum lateral acceleration for a passenger car type vehicle is typically 1 g≈9.8 m/s². Thus the set of feasible maneuvers E is given by $E=[-9.8\ 9.8]$, in this case.

In the following is assumed that both the host and the obstacle move with constant acceleration laterally. This is described in (1).

$$x(t) = x_0 + \dot{x}_0 t + \frac{\ddot{x}_0 t^2}{2} \quad (1)$$

The lateral acceleration needed to avoid an obstacle can be calculated as:

$$\ddot{x}_{needed} = \ddot{x}^{obstacle}_{lat,0} + \frac{-\tilde{x}_{lat,0} \pm \frac{w^{host}}{2} \pm \frac{w^{obstacle}}{2} - \dot{\tilde{x}}_{lat,0} TTC}{TTC^2} \quad (2)$$

In those cases where a solution exist the time to collision, TTC, may be calculated as:

$$TTC = \begin{cases} \dfrac{\tilde{x}_{long,0}}{\dot{\tilde{x}}_{long,0}}, \tilde{\ddot{x}} = 0 \\ \dfrac{-\dot{\tilde{x}}_{long,0}}{\ddot{\tilde{x}}_{long,0}} \pm \dfrac{\sqrt{\dot{\tilde{x}}^2_{long,0} - 2\tilde{x}_{long,0}\ddot{\tilde{x}}_{long,0}}}{\ddot{\tilde{x}}_{long,0}}, \tilde{\ddot{x}} \neq 0 \end{cases} \quad (3)$$

Where:
$\ddot{x}_{needed}$ needed lateral acceleration (m/s²)
$x_{i,0}^j$ lateral or longitudinal position for obstacle or host vehicle (m)
$\dot{x}_0^j$ velocity for obstacle or host (m/s)
$\ddot{x}_0^j$ acceleration for obstacle or host (m/s²)
$w^j$ vehicle width for obstacle or host (m)

Subscript "lat" and "long" denotes lateral and longitudinal motion respectively and superscript "host" and "obstacle" denotes the host and the obstacle vehicle.
$\tilde{x}=x^{obstacle}-x^{host}$ relative distance (m)
$\dot{\tilde{x}}=\dot{x}^{obstacle}-\dot{x}^{host}$ relative velocity (m/s)
$\ddot{\tilde{x}}=\ddot{x}^{obstacle}-\ddot{x}^{host}$ relative acceleration (m/s²)

Figure 2:
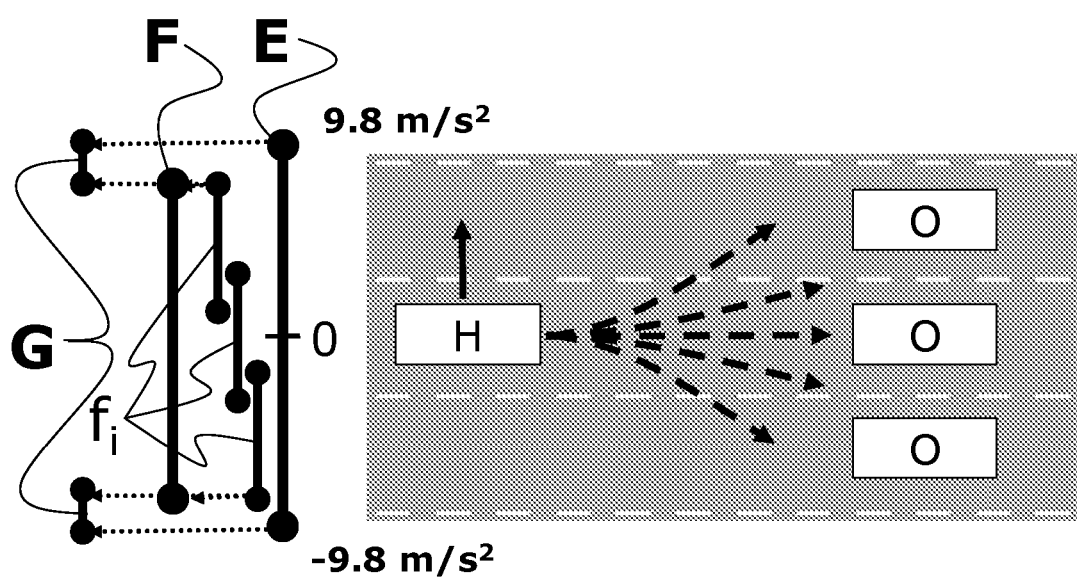
FIG. 2 illustrates schematically the method for establishing the set G that represents the maneuvers that will avoid collision.

From (2), the sets $f_i$ of steering maneuvers that lead to collision are calculated for each obstacle. These sets are represented as intervals of acceleration $[\ddot{x}_{needed}^{Left}\ \ddot{x}_{needed}^{Right}]$, in which all maneuvers will lead to collision with a particular object. An important element of this invention is that these intervals ($f_i$) can be combined into the set F, which makes it possible to calculate the set G that represents the maneuvers that will avoid collision. For an illustration of these sets in a road scenario reference is made to FIG. 2. In FIG. 2 H denotes the host vehicle and O denotes obstacle vehicles. E denotes the set of feasible maneuvers, $f_i$ denotes the set of maneuvers that lead to a collision with obstacle i, which can be combined into the set F. G represents the maneuvers through which collision will be avoided.

A similar method to that described above for lateral maneuvers can be used for longitudinal motion.

The present invention can also be applied to situations where longitudinal and lateral maneuvers are combined. Then, the sets ($f_i$) are represented by two-dimensional areas. Typically, longitudinal and lateral motion capabilities influence each other in a passenger vehicle, which makes the evaluation more complex. However, even in these cases, it may be assumed that the coupling of lateral and longitudinal forces is insignificant, for the benefit of a less complex calculation.

The present invention also relates to an automotive vehicle forward collision avoidance system including an implementation of the method for decision-making in multiple obstacle scenarios as described above.

The present invention also relates to an automotive vehicle comprising an automotive vehicle forward collision avoidance system including an implementation of the method for decision-making in multiple obstacle scenarios as described above.

The invention is not limited to the above-described embodiments, but may be varied within the scope of the following claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for autonomous collision avoidance in multiple obstacle scenarios comprising the steps of:
operating at least one sensor to detect a plurality of obstacles in front of a vehicle hosting the system;

operating a forward collision avoidance system to estimate a position, a velocity and an acceleration of each of the obstacles;

evaluating for each respective one of the obstacles separately a set of collision maneuvers which the vehicle is capable of performing that will lead to a collision with the respective obstacle;

forming a union of the sets of collision maneuvers which will lead to collision with any one of the obstacles;

establishing a set of avoidance maneuvers which the vehicle is capable of performing through which collision with any of the obstacles may be avoided;

deciding how to avoid or mitigate collision with any one of the obstacles based at least in part on the set of avoidance maneuvers; and autonomously executing a collision avoidance maneuver based on the decision.

2. A method according to claim 1, further comprising the steps of:

defining a set E of all possible maneuvers that the vehicle can perform;

defining, for each obstacle i={1, ..., N}, a new set $f_i$, where $f_i$ defines the set of collision maneuvers for obstacle i;

forming a combined set of all collision maneuvers, which is given by $F=f_1 \cup \ldots \cup f_N$; and where all avoidance maneuvers are given by the set $G=E \backslash F$, and a collision may be considered to be unavoidable if $G=\emptyset$; and establishing a maneuver that avoids collision using min (G), which denotes the maneuver with a smallest effort that avoids collision.

3. A method according to claim 1, wherein the step of deciding how to avoid or mitigate collision comprises:

calculating a lateral acceleration required to avoid collision with each of the plurality of obstacles.

4. A method according to claim 3, wherein in the step of calculating a lateral acceleration required to avoid collision with a each of the plurality of obstacles it is assumed that both the vehicle and the respective obstacle move with constant acceleration laterally, and the lateral acceleration required to avoid collision with an obstacle is calculated as:

$$\ddot{x}_{needed} = \ddot{x}_{lat,0}^{obstacle} + \frac{-\tilde{\dot{x}}_{lat,0} \pm \frac{w^{host}}{2} \pm \frac{w^{obstacle}}{2} - \tilde{\ddot{x}}_{lat,0} TTC}{TTC^2}$$

where, in those cases where a solution exist a time to collision, TTC, is calculated as:

$$TTC = \begin{cases} \frac{\tilde{x}_{long,0}}{\tilde{\dot{x}}_{long,0}}, & \tilde{\ddot{x}} = 0 \\ \frac{-\tilde{\dot{x}}_{long,0} \pm \sqrt{\tilde{\dot{x}}_{long,0}^2 - 2\tilde{\ddot{x}}_{long,0}\tilde{x}_{long,0}}}{\tilde{\ddot{x}}_{long,0}}, & \tilde{\ddot{x}} \neq 0 \end{cases}$$

where;

$\ddot{x}_{needed}$ is the needed lateral acceleration (m/s²)

$x_{i,0}^j$ is a lateral or longitudinal position for the obstacle or the vehicle (m)

$\dot{x}_0^j$ is a velocity for the obstacle or the vehicle (m/s)

$\ddot{x}_0^j$ is an acceleration for the obstacle or the vehicle (m/s²)

$w^j$ is a vehicle width for the obstacle or the vehicle (m) and;

subscript "lat" and "long" denotes lateral and longitudinal motion respectively and superscript "host" and "obstacle" denotes the vehicle and the obstacle, such that;

$\tilde{x} = x^{obstacle} - x^{host}$ is a relative distance (m)

$\tilde{\dot{x}} = \dot{x}^{obstacle} - \dot{x}^{host}$ is relative velocity (m/s)

$\tilde{\ddot{x}} = \ddot{x}^{obstacle} - \ddot{x}^{host}$ is a relative acceleration (m/s²).

5. A safety system for an automotive vehicle comprising:

at least one sensor operable to detect a plurality of obstacles in front of the vehicle; and a forward collision avoidance system operative to:

receive signals from the at least one sensor and, based at least in part upon the signals, estimate a position, a velocity and an acceleration of each of the obstacles;

evaluate for each respective one of the obstacles separately a set of collision maneuvers which the vehicle is capable of performing that will lead to a collision with the respective obstacle;

form a union of the sets of collision maneuvers which will lead to collision with any one of the obstacles;

establish a set of avoidance maneuvers which the vehicle is capable of performing through which collision with any of the obstacles may be avoided;

decide how to avoid or mitigate collision with any one of the obstacles using the set of avoidance maneuvers; and direct a collision avoidance maneuver based on the decision.

6. A system according to claim 5, wherein the at least one sensor comprises at least one of a RADAR system, a LIDAR system or a camera based system monitoring a region in front of the vehicle.

7. A system according to claim 5, wherein the forward collision avoidance system is further operative to:

define a set E of all possible maneuvers that the vehicle can perform;

define, for each obstacle i={1, ..., N}, a new set $f_i$, where $f_i$ defines the set of collision maneuvers that lead to a collision with obstacle i;

form a combined set of all maneuvers leading to a collision, which is given by $F=f_1 \cup \ldots \cup f_N$, and where the set of avoidance maneuvers is given by a set $G=E \backslash F$, and a collision may be considered to be unavoidable if $G=\emptyset$; and establish a maneuver that avoids collision using min(G), which denotes a maneuver with a smallest effort that avoids collision.

8. A system according to claim 7, wherein the forward collision avoidance system is further operative to:

calculate a lateral acceleration required to avoid collision with each of the plurality of obstacles under the assumption that both the vehicle and the respective obstacle move with constant acceleration laterally, the lateral acceleration required to avoid collision with the obstacle calculated as:

$$\ddot{x}_{needed} = \ddot{x}_{lat,0}^{obstacle} + \frac{-\tilde{\dot{x}}_{lat,0} \pm \frac{w^{host}}{2} \pm \frac{w^{obstacle}}{2} - \tilde{\ddot{x}}_{lat,0} TTC}{TTC^2}$$

and, in those cases where a solution exist, arranged to calculate a time to collision, TTC, as:

$$TTC = \begin{cases} \dfrac{\tilde{x}_{long,0}}{\dot{\tilde{x}}_{long,0}}, & \ddot{\tilde{x}} = 0 \\ \dfrac{-\dot{\tilde{x}}_{long,0}}{\ddot{\tilde{x}}_{long,0}} \pm \dfrac{\sqrt{\dot{\tilde{x}}_{long,0}^2 - 2\tilde{x}_{long,0}\ddot{\tilde{x}}_{long,0}}}{\ddot{\tilde{x}}_{long,0}}, & \ddot{\tilde{x}} \neq 0 \end{cases}$$

where;

$\ddot{x}_{needed}$ is the needed lateral acceleration (m/s$^2$)

$x_{i,0}^j$ is a lateral or longitudinal position for the obstacle or the vehicle (m)

$\dot{x}_0^j$ is a velocity for the obstacle or the vehicle (m/s)

$\ddot{x}_0^j$ is an acceleration for the obstacle or the vehicle (m/s$^2$)

$w^j$ is a vehicle width for the obstacle or the vehicle (m) and;

subscript "lat" and "long" denotes lateral and longitudinal motion respectively and superscript "host" and "obstacle" denotes the vehicle and the obstacle, such that;

$\tilde{x} = x^{obstacle} - x^{host}$ is the relative distance (m)

$\dot{\tilde{x}} = \dot{x}^{obstacle} - \dot{x}^{host}$ is the relative velocity (m/s)

$\ddot{\tilde{x}} = \ddot{x}^{obstacle} - \ddot{x}^{host}$ is the relative acceleration (m/s$^2$).

9. A method for autonomous collision avoidance in multiple obstacle scenarios comprising the steps of:

operating at least one sensor to detect a plurality of obstacles in front of a vehicle hosting the system;

operating a forward collision avoidance system to estimate a position, a velocity and an acceleration of each of the obstacles;

evaluating for each respective one of the obstacles separately a set of collision maneuvers which the vehicle is capable of performing that will lead to a collision with the respective obstacle;

forming a union of the sets of collision maneuvers which will lead to collision with any one of the obstacles;

establishing a set of avoidance maneuvers which the vehicle is capable of performing through which collision with any of the obstacles may be avoided;

selecting from the set of avoidance maneuvers a collision avoidance maneuver requiring a minimum level of acceleration experienced by the vehicle; and autonomously executing the collision avoidance maneuver.

\* \* \* \* \*

UNITED STATES PATENT AND TRADEMARK OFFICE
CERTIFICATE OF CORRECTION

PATENT NO.      : 7,647,178 B2
APPLICATION NO. : 11/380748
DATED           : January 12, 2010
INVENTOR(S)     : Ekmark et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 721 days.

Signed and Sealed this

Twenty-eighth Day of December, 2010

David J. Kappos
*Director of the United States Patent and Trademark Office*